May 23, 1967

H. A. CURRIE, JR., ETAL 3,321,610

DECIMAL RATE MULTIPLICATION SYSTEM

Filed Jan. 14, 1964

INVENTORS
HARRY A. CURRIE, JR.,
JACK S. MASON, ROBERT H. WISE
BY

ATTORNEY

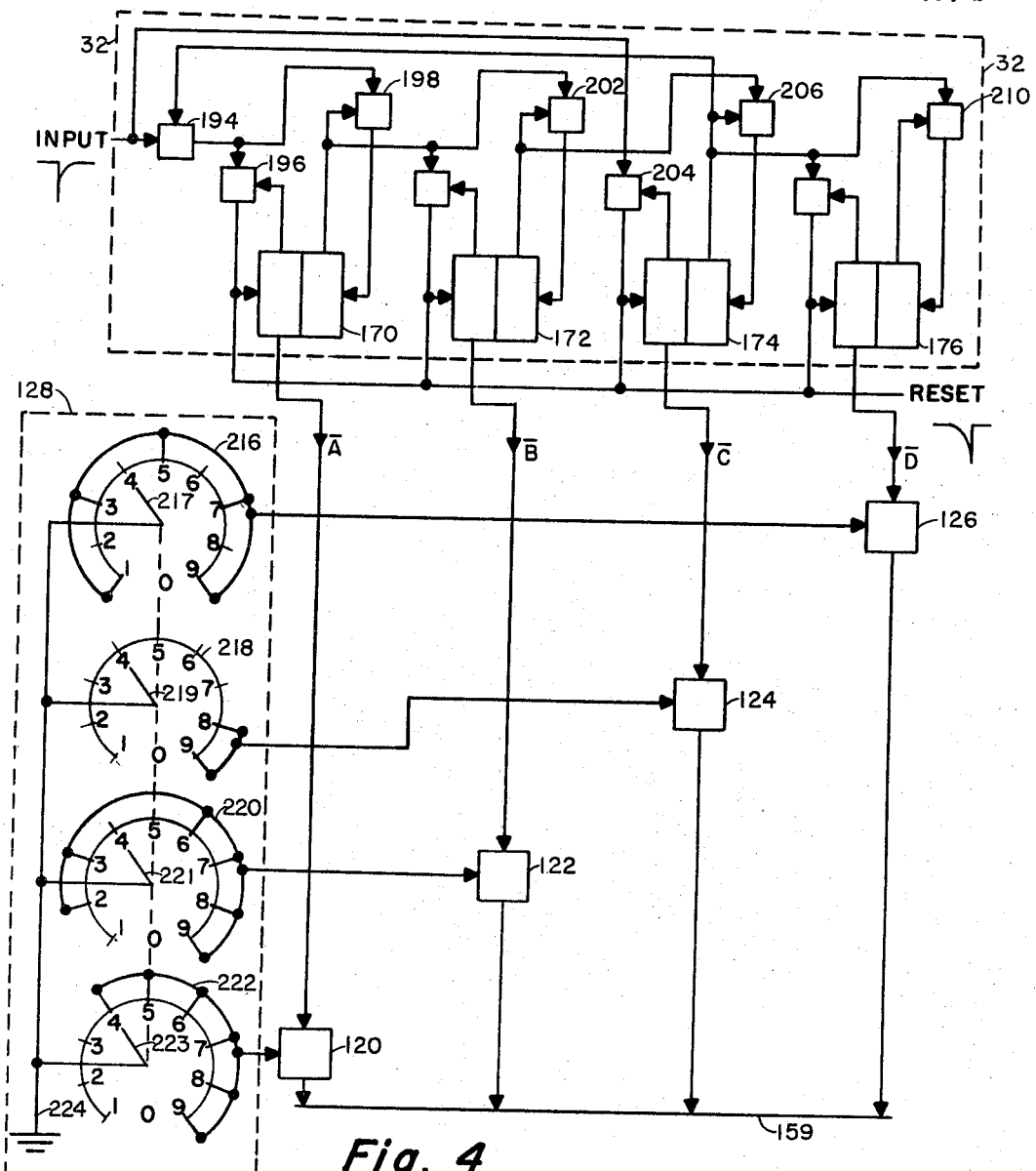
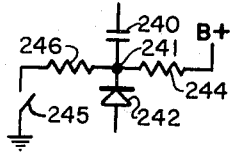
Fig. 3b
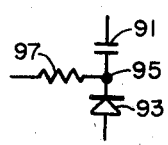
Fig. 3a
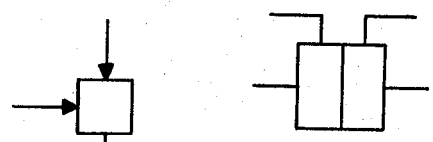
Fig. 3c    Fig. 2
Fig. 4
INVENTORS
HARRY A. CURRIE, JR.,
JACK S. MASON, ROBERT H. WISE
BY
ATTORNEY

INVENTORS
HARRY A. CURRIE, JR.,
JACK S. MASON, ROBERT H. WISE
BY
ATTORNEY

United States Patent Office 3,321,610
Patented May 23, 1967

3,321,610
DECIMAL RATE MULTIPLICATION SYSTEM
Harry A. Currie, Jr., Dallas, Jack S. Mason, Richardson, and Robert H. Wise, Dallas, Tex., assignors, by direct and mesne assignments, of one-half to Texas Instruments Incorporated, Dallas, Tex., a corporation of Delaware, and one-half to Sanitary Scale Company, Belvidere, Ill., a corporation of Illinois
Filed Jan. 14, 1964, Ser. No. 337,636
16 Claims. (Cl. 235—160)

The present invention relates to decimal rate multiplication and more particularly to an improved digital decimal rate multiplication system wherein provision is made for rounding off insignificant digits.

Decimal rate multiplication is used in many applications. For example, in the copending application, Ser. No. 337,619, filed Jan. 14, 1964, for Price Computing and Marking Apparatus, and assigned to the common assignee of the present invention, there is disclosed a price computing and marking apparatus for automatically weighing a product, computing the price of the product on the basis of price per pound information set into the apparatus and thereafter printing a ticket marked with the weight of the product and the total price of the product. The decimal rate system of the present invention is especially adapted for use in the above system. However, it will also find utility in many other applications.

In accordance with one preferred embodiment of the present invention, a first register which comprises a suitable number of decades is provided. The input to the first register is a number of pulses related to the multiplicand. A switch and gate matrix is also provided. Selected ones of the binary functions from the register are applied through gates to an accumulating bus. The gates are opened and closed in accordance with multiplier information as set in switches for passing to the bus a number of pulses related to the product. The switches and gates associated with the more significant decades pass a number of pulses equal to the switch setting associated with each decade. However, the switch and gate arrangement associated with the least significant decade only passes pulses in a preselected manner, rendering it possible to obtain multiplication and the desired rounding off with one less decade in the system. It is therefore possible to operate at a clock frequency an order of magnitude less than would otherwise be required. The bus is applied to another decade which is preset to 5. The output of the preset decade is a series of pulses which are applied to a total register.

Many objects and advantages of the present invention will become apparent to those skilled in the art as the following detailed description of the same unfolds when taken in conjunction with the appended drawings wherein like reference numerals denote like parts and in which:

FIGURE 2 shows a symbol used to represent a flip-flop;

FIGURE 3a is a schematic diagram of one type of pulse gate;

FIGURE 3b is a schematic diagram of another type of pulse gate;

FIGURE 3c shows a symbol used to represent a pulse gate;

FIGURE 4 is a block diagram illustrating one stage of a decimal rate multiplication system.

Figure 1:
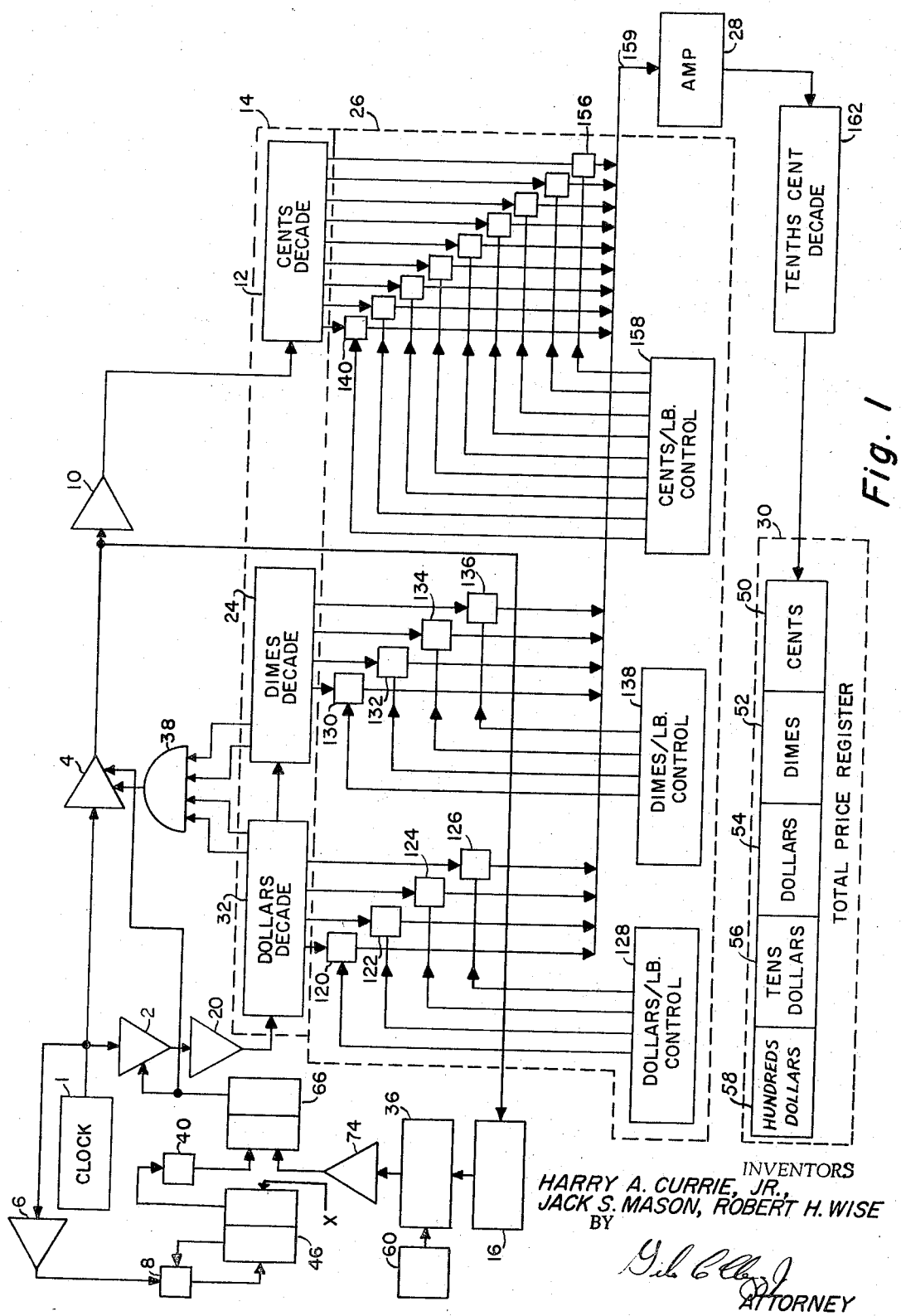
FIGURE 1 is a block diagram illustrating a preferred embodiment of the present invention.

Turning now to FIGURE 1 of the drawings, a preferred embodiment of the present invention is shown in block diagram form. In accordance with this specific example, the multiplicand is the weight of an object, the multiplier is the cost per pound of the object, and the product is the total price of the object. Thus, the decimal rate multiplication system of the present invention can be seen to include a clock 1 which may comprise any suitable pulse generator having a reasonably constant output frequency. The output of the clock 1 is applied to three amplifiers, a price amplifier 2, a weight amplifier 4 and a control gate amplifier 6. The amplifiers 2, 4 and 6 are of conventional type and serve to amplify the pulses produced by the clock 1 and also in some instances are utilized as gates to control the application of the clock pulses to various registers.

Three separate registers, namely, a price per pound register 14, a gross weight register 16 and a total price register 30 are provided. The price per pound register 14 comprises a number of decades equal to the number of digits in the multiplier, and in this example comprises a cents decade 12, a dimes decade 24 and a dollars decade 32. The cents decade 12 is suitably a five bit decade connected to form what is known as a Johnson counter. Five bits A–E are thereby provided. The dimes decade 24 and dollars decade 32 are each conventional binary decimal code decades, each having four bits A–D.

The gross weight register 16 must be capable of indicating the largest desired multiplicand, and in this example comprises three four bit binary counters, each of which is capable of counting to 16, or a total count of 4096. The gross weight register 16 provides twelve binary bits A–L.

The total price register 30 comprises an appropriate number of decades for counting the maximum total price (product), each of which is connected to count to ten according to the binary decimal code. Each decade, therefore, provides four bits A–D. In accordance with the specific example, five decades are provided in the total price register, namely, a cents decade 50, a dimes decade 52, a dollars decade 54, a ten dollars decade 56 and a hundred dollars decade 58.

The output of the control gate amplifier 6 is applied through a pulse gate 8 to a sync flip-flop 46. One output of sync flip-flop 46 is applied to control gate 8 and the other is applied to one input of master control flip-flop 66 through pulse gate 40. The output of the gross weight amplifier 4 is applied to the amplifier 10 which functions to invert the signal and apply clock pulses to the input of the cents decade 12 of the price per pound register 14. The output of the gross weight amplifier 4 is also applied to the input of the gross weight register 16. The output of the price amplifier 2 is applied through an inverting amplifier 20 to the input of the dollar decade 32 of the price per pound register 14.

The 13 binary bits generated by the price per pound register 14 are each applied to a gate and switch matrix 26 whose output is a selected number of pulses. The output of the gate and switch matrix 26 is applied via line 159 through amplifier 28 to a decade 162 which is preset to 5. After 5 pulses from the amplifier 28, the decade 162 will apply one pulse to the total price register 30 and one for each ten pulses thereafter. The number of counts stored in the total price register 30 provides a binary word indicative of the decimal digit of the product, in this instance the total price of the product whose price is being computed.

The output of the gross weight register 16 is twelve binary bits A–L which are suitably applied to a binary to Gray converter and comparator 36 and compared against the Gray code bits M–X produced by an encoder 60. Such comparison circuits are well known and accordingly, a detailed description will not be given. The encoder 60 provides a digital word forming a decimal digit equal to a predetermined multiplicand, in this instance the total weight of the article. Upon comparison between the predetermined multiplicand and the multiplicand represented by the count stored in the gross weight register, a pulse is applied through amplifier 74 to a master control flip-flop 66. The master control flip-flop will thereupon apply an inhibit voltage to the amplifiers 2 and 4 preventing further pulses being applied to the price register 14, the total price register 30, and the gross weight register 16.

It will be seen that the outputs are provided from the dollar decade 32 and from the dime decade 24 to the gross weight gate 38. The gross weight gate 38 is connected to apply an inhibit voltage to the gross weight amplifier 4.

The flip-flops utilized in the system are conventional bistable transistor circuits which can be switched from one stable state to the other and will thereafter remain in the other stable state. Each flip-flop is represented schematically by the symbol shown in FIGURE 2, although only the inputs and outputs actually utilized will be shown. The left output is taken from the collector of the left hand transistor and the right output is taken from the collector of the right hand transistor. In similar fashion, the left input and right input are applied to the bases of the left hand and right hand transistor, respectively. Each of the transistors is capable of being turned on responsive to a positive potential applied to its base, and each of the transistors can be turned off by a negative potential applied to its base. The interconnection between the transistors is such that if one of the transistors conducts, a bias will be produced to cut off the other. If one of the transistors is conducting, a digital "0" is produced at its collector. If one of the transistors is not conducting, the potential at its collector will be near B+ (suitably +18 volts), and the digital output is a "1." The digital function is always taken from the collector of the right hand transistors, and the Not Function is taken from the output of the left side. Each bit includes two functions, the Not Function and the Function. The Not Function of, for example, bit A can be denoted $\bar{A}$ and the Function as A.

A pulse gate preferred for use in all parts of the system except the gate and switch matrix 26 is shown schematically in FIGURE 3a of the drawings and can be seen to comprise a capacitor 91 connected in series with a diode 93. The diode 93 is poled such that a positive potential applied to the juncture 95 between the diode 93 and resistor 97 will back bias the diode 93. The input to the pulse gate will be applied to the capacitor 91, and the diode 93 is connected to the output. The control voltage is applied through resistor 97. It will be remembered that the various negative pulses are produced when the output of one of the flip-flops goes from a "1" to a "0." Accordingly, the capacitor 91 differentiates the change in potential to produce the desired negative pulse. The control voltage is either a digital "1" or a digital "0." It is normally necessary that the control voltage be a digital "0" or at ground potential before the pulse gate will pass the negative pulse. The symbol used to designate a pulse gate is shown in FIGURE 3c.

Briefly, the operation of the computer is as follows. The clock 1 will be running, but an inhibit voltage will be applied to the gross weight amplifier 4 and the price amplifier 2 by the master control flip-flop 66. Accordingly, pulses will not be applied to any of the registers in the computer. All of the registers in the computer will be set to zero. The left output of the sync flip-flop 46 will be a binary "1" and the left output of master control flip-flop will be a binary "0." Suitable circuitry, not shown, is provided for insuring that the above conditions exist at the beginning of a computation.

The operation of the computer will be inhibited until an input X is applied to the sync flip-flop. When the sync flip-flop switches, its left output will become a "0" opening pulse gate 8. The next clock pulse will again trigger the sync flip-flop causing its right output to go from a "1" to a "0," causing a negative going pulse to be passed through pulse gate 40 to trigger master control flip-flop 66. When the master flip-flop 66 changes state, it will remove the inhibit voltage from the price amplifier 2 and the gross weight amplifier 4. Clock pulses from the clock 1 will, therefore, be applied to the dollar decade 32. However, the gate 38 will continue to inhibit the gross weight amplifier 4. Every ten pulses applied to the dollar decade 32 will produce one output pulse which is applied to the dime decade 24. For every 100 pulses applied to the dollar register, the gross weight gate 38 will produce one output pulse which momentarily removes the inhibit voltage provided by the gross weight gate to the gross weight amplifier 4 and one pulse will be applied to the gross weight register 16 and to the cents decade 12.

When the weight indicated by the twelve bit digital word produced by the gross weight register 16 is equal to the twelve bit digital word in the encoder 60, the binary to Gary converter and comparator 36 will produce an output pulse which will trigger the master control flip-flop 66 to inhibit the gross weight amplifier and the price amplifier 2, preventing additional pulses from the clock 1 being applied to any of the registers.

The bit functions produced by the dollar decade 32, and dimes decade 24, and cents decade 12 in the price register 14 are each applied to the gate and switch matrix 26 which selectively passes certain of the pulses to accomplish multiplication of the weight stored in the gross weight register 16 by the price per pound information.

Pulses produced by the gate and switch matrix 26 are applied via line 159 through the total price amplifier 28 to the total price decade 30 which counts the pulses and produces five digital numbers in binary decimal code form indicative of the total price of the product.

The operation of the system will now be described in greater detail. Initially, the price per pound of the article is preset into the system by setting certain wafer switches included in the gate and switch matrix 26. The clock 1 has its output connected to the input of the dollar decade counter unit 32 through amplifiers 2 and 20, as described previously. For present purposes, it will be assumed that amplifier 2 is not inhibiting pulses from the clock to the input of the decade unit 32. The decade unit 32 generates an output pulse in response to the tenth input pulse thereto, and the output pulse is fed to the dime decade counter unit 24. This unit is identical to the preceding unit and also produces one output pulse for each ten input pulses thereto.

The two most significant Functions from the dollar decade 22 and the dimes decade 24 are applied to the AND gate 38. An inhibit voltage will normally be applied to the amplifier 4 from AND gate 38. However, each one-hundredth pulse applied to the dollar decade 32 will momentarily remove the inhibit voltage from amplifier 4, permitting every one-hundredth pulse generated by clock 1 to be applied to the cents decade 12 and the gross weight register 16.

If the total weight of the article is 26.57 pounds, and as each one-hundredth pulse is applied to the gross weight counter, 265,700 pulses must be produced by clock 1 and applied to dollar decade 32 for the count in the gross weight register to be as above. As described previously, the digital word from the gross weight register 16 is compared with the digital word from the encoder 60 by converter and comparator 36, and upon comparison, the amplifiers 2 and 4 are inhibited, preventing additional pulse being applied to any of the registers from clock 1.

Also as described previously, each of the decades 24 and 32 comprise four flip-flops connected to count according to the binary decimal code. Four bits of digital information can be obtained from each of the decades in registers 24 and 32, namely, four Functions A, B, C and D, and four Not Functions $\bar{A}, \bar{B}, \bar{C}$ and $\bar{D}$. The decade 12 comprises five flip-flops and five bits A, B, C, D and E of digital information can be obtained.

To calculate the correct total price of the article being weighed, certain of the outputs of each of the decade counters 12, 24 and 32 are connected to the inputs of gates which are controlled by price per pound control units. Pulses are generated at these outputs in response to input pulses to the particular decade counter, and as will become apparent below, only one output pulse is generated at any single instant.

The four Not Functions of the dollars decade unit 32 are connected to the inputs of gates 120, 122, 124 and 126, respectively. A suitable gate is that shown in FIGURE 3b which is seen to comprise a capacitor 240 connected in series with the cathode of a diode 242. If a positive control voltage is applied to the juncture 241 between the capacitor and the diode, the diode will be reverse biased, and a negative pulse of magnitude less than the positive control voltage applied to the capacitor will not be passed by the diode. However, an output will be produced at the anode of diode 242 if the magnitude of the control voltage at juncture 241 becomes less than the magnitude of the input pulse causing the diode to become forward biased. In the form shown, the control voltage, suitably B+, is applied through a resistor 244 to the juncture, and the juncture 241 is connected through resistor 246 and switch 245 to ground. The resistances of resistors 244 and 246 are chosen such that when switch 245 is closed, a negative voltage pulse in the order of ten volts at the input to capacitor 240 will forward bias the diode and produce an output at the anode of the diode. If the switch is open, the control voltage will maintain the diode back biased and the pulse cannot pass. Thus, when a negative pulse is applied to one of the gates from the decade unit, it will pass through the gate or be blocked thereby, depending upon whether the gate is opened or closed by the switch of its particular control unit.

A dollars per pound control unit 128 is connected to each of the gates 120, 122, 124 and 126 of the dollars decade unit 32 to permit pulses from the decade unit to pass through selected numbers of the gates, wherein the selected number is the integral number of dollars per pound of the article. A negative pulse is produced each time one of the Not Functions changes from a "1" to a "0." Similarly, the dimes decade unit 24 is provided with gates 130, 132, 134 and 136 which are controlled by a dimes per pound control 138 to permit negative pulses from the dimes decade to pass through selected gates thereof, particular gates opened by the control unit 138 being determined by the largest integral number of dimes per pound of the article exceeding the largest integral number of dollars per pound of the article.

The cents decade unit 12 has five flip-flops and is somewhat more complicated than the preceding dollars and dimes decade units. Nine outputs are connected from the cents decade to nine gates which are controlled by the cents per pound control 158. The control 158 opens a selected number of the gates determined by the largest integral number of cents per pound of the article exceeding the addition of the price per pound set by controls 128 and 138. As the pulses from the three decade units 12, 24 and 32 pass through the particular gates which are opened by the controls, they are applied to the line 159 which is connected to the input of an amplifier 28, where they are amplified and fed to the input of a tenths cent decade 162. As will be explained hereinafter, the tenths cent decade 162 cooperates with the cents decade 12 and the cents per pound control 158 to round off the total price of the article to the nearest cent. That is to say, if the total price of the article is 4.374 dollars, the price will be rounded off to 4.37 dollars. If, however, the actual total cost of the article is 4.375 dollars, the price will be rounded off to 4.38 dollars. The output of the tenths cent decade unit 162 is connected to the input of the total price register 30 which comprises five decade units designated respectively as the cents, dimes, dollars, tens dollars and hundred dollars decade units, as described previously.

In order to illustrate how the total price is accumulated in the register 30, an example will be assumed where the total weight of the article is 3.65 pounds, and the price of the article is $2.36 per pound. A total of 365 pulses must be applied to the input of the gross weight register 16 before comparison will be effected and the amplifiers 2 and 4 inhibited. Since only each one-hundredth pulse is applied to the gross weight register 16, a total of 36,500 pulses will have been applied to the input of the dollars decade 32. In this example, the dollars per pound control unit 128 is set at two dollars per pound, the dimes control unit 138 is set at three dimes per pound, and the cents control unit 158 is set at six cents per pound.

Initially, all decade counters are preset to a zero count before computation of weight and price is started. The decade units 12, 24 and 32, which will be described below in detail, generate one pulse at the input of one of the gates connected thereto for each input pulse from the clock 1. The function of the price per pound control units is to open selected gates to pass to line 159 a selected number of pulses for each ten input pulses to the decade unit, where the selected number is equal to the number of dollars, dimes or cents per pound, as the case may be.

Thus, in the example given, for each ten input pulses to the dollars decade 32, two pulses are passed to line 159 through one or more of the gates connected to the decade as selected by the dollars/lb. control 128. For each ten input pulses to the dimes decade 24, three pulses are passed to line 159 through one or more of the gates connected to the decade as selected by the dimes/lb. control 138. Similarly, for each ten input pulses to the cents decade 12, six pulses are passed to line 159 through one or more of the gates selected by the cents/lb. control 158. Moreover, in those instances wherein the total number of pulses applied to the input of the cents decade during the price computation is not an exact multiple of ten, such as the case of the present example, there are 365 input pulses, the cents/lb. control 158 passes six pulses to line 159 for each ten input pulses up to 360. The number of pulses passed to line 159 for the remaining five input pulses is such as to produce the proper round off function in conjunction with the tenths cent decade 162, as will be described below.

It can be seen, then, that the sequence in which the cents per pound control 158 opens the gates connected to the cents decade is important. In the course of the count, 7300 pulses will be applied to line 159 from the dollars decade 22 in response to the 36,500 input pulses thereto, 1095 pulses will be applied to the line 159 from the dimes decade 24 in response to the 3650 input pulses thereto, and 216 pulses will be applied to line 159 from the cents decade 12 in response to the first 360 input pulses thereto in addition to a number of pulses in response to the remaining five input pulses determined in the manner described hereinafter. It will be noted that pulses are applied to the line 159 from the respective decade units in response to the series of pulses from the clock 1, and, therefore, none of the pulses applied to the line 159 will occur simultaneously with any other pulse applied thereto.

To properly round off the total price to the nearest whole cent, the tenths cent decade 162 is initially preset to a count of five, and thereafter performs a count of ten function as pulses are applied to its input through amplifier 28. This is equivalent to applying five pulses to the input of the tenths cent decade 162 prior to starting the computation. The output of the tenths cent decade 162 drives the serially connected decade counters comprising the total price register with one output for every ten input pulses.

At the start of the computation, a pulse is delivered to the input of the total price register in response to the fifth input pulse to the tenths cent decade 162, since the latter is initially preset to a count of five, which is equivalent to accumulating a price of one cent for the first one-half cent computed and thereafter accumulating one cent in the price register for every one cent computed. It can then be seen that after the first five input pulses to the tenths cent decade, that one cent in price will be accumulated in the register for each ten input pulses to the tenths cent decade. If, after the first five input pulses to the tenths cent decade 162, the number of pulses exceeding the largest number of pusles which is an integral multiple of ten is equal to or greater than five, an additional cent in price will be accumulated; whereas, if the number is less than five, the additional cent will not be added.

Each pulse applied to the weight register 16 represents .01 pound and, therefore, the total number of pulses applied to the inputs of the dollars and the dimes decades 32 and 24 will be an even mutliple of ten. Since the dollars and dimes control units 128 and 138 are preset to pass an integral number of pulses to line 159 for each ten pulses applied to its respective decade unit, the sequence in which the pulses applied to the line 159 is immaterial, and only the total number of pulses applied in response to each ten pulses applied to the input of either of the decades is important. However, this is not the case for the cents decade unit 12. In order to determine the total number of pulses to be applied through line 159 to the input of tenths cent decade 162 from the cents decade 12, it is helpful to use an example to determine how the total correct price of the article is accumulated, wherein the above example will be used.

It has already been established that 7300 pulses will be derived from the dollars decade, 1095 pulses will be derived from the dimes decade and 216 pulses will be derived from the cents decade for the first 360 input pulses thereto, or a subtotal of 8611 pulses. The price accumulated in the total price register up to this point can be determined by adding five pulses to this subtotal to account for the initial presetting of the tenths cent decade to a count of 5. This is now 8618 pulses. Dividing this by 10 to account for the divide by ten function of the tenths cents decade yields 861 input pulses to the total price register and leaving the tenths cent decade at a count of 6. Thus the dollars counter in the total price register is at a count of 8, the dimes decade is at a count of 6 and the cents decade is at a count of 1, or a price of $8.61. By multiplying the total weight of the article (3.65 lbs.) by the price per pound ($2.36/lb.) yields a total price of $8.61. Since the total price accumulated to this point is correct, it can be seen that the cents/lb. control 158 must pass no more than three additional pulses to the tenths cent decade in response to the last five input pulses to the cents decade 12 or the tenths cent decade count will be advanced back to zero and will deliver an additional pulse to the cents decade of the total price register. It is now apparent that the total number of pulses passed to line 159 from the cents decade 12 by the control 158 for each ten input pulses thereto is important, but in addition, the sequence of occurrence of these pulses is important.

The particular sequences by which the pulses from the cents decade 12 must be applied to the line 159 for the various settings of the cents per pound control can be seen as follows: The cents per pound control 158 is set to add a certain number of cents to the total price for each pound of the item accumulated in the weight register. Each input pulse to the cents decade 12 represents .01 lb., and therefore, the cents per pound control 158 can be thought of as adding to the total price of the item a certain number of hundredths of a cent for each hundredth of a pound accumulated in the weight register. Since the tenths cent decade 162 is capable of counting only the integral number of tenths cents comprising the total price and then rounding off to the nearest cent, only those pulses from a cents decade 12 representing the largest number of integral tenths cents should be applied to the input of the tenths cent decade 162. In the present example, the price of the article was assumed to be $2.36/lb. This means that the cents per pound control 158 would add six cents for every pound accumulated in the weight register, or .06 cent for every one-hundredth of a pound accumulated in the weight register. Thus for each input pulse to the cents decade 12, .06 cent should be added to the total price. However, since .06 cent is less than an integral number of tenth cents, this should be discarded and not applied to the tenths cent decade 162. Two pulses to the input of the cents decade 12 will be equivalent to an addition of .12 cent to the total price. Since this is more than one-tenth cent but less than two-tenths cent, one pulse should be applied to the tenths cent decade 162. Three pulses to the input of the cents decade is equivalent to an addition of .18 cent to the total price and still only one pulse should be applied. Four input pulses will require the addition of two pulses to the tenths cent decade 162, since this is an addition of .24 cent to the total price. By carrying this procedure out for ten input pulses to the cents decade 12 and then repeating the procedure ten times for 0 to 10 cents a pound, it can be seen that the cents per pound control 158 should pass a first pulse to line 159 when the product of the price per pound in cents as set by the control 158 and the number of input pulses is equal to or greater than 10 but less than 20, a second pulse when the product is equal to or greater than 20 but less than 30, and so forth. These sequences will provide the proper rounding off function in conjunction with the tenths cent decade 162 whatever the price per pound or the total weight of the article.

There is shown in FIGURE 4 a block diagram of the dollars decade 32, the dollars per pound control 128, and the gates 120, 122, 124 and 126. It should be noted that the dimes decade 24, the dimes per pound control 138 and the gates 130, 132, 134 and 136 are identical to that shown in FIGURE 4 and will not be described separately. Moreover, the tenths cent decade unit 162, and each of the decade units within the total price register 30 are identical to the decade unit 32 to be described.

The decade unit 32 comprises four conventional transistor flip-flops 170, 172, 174 and 176. The decade counter 32 also includes a plurality of gates which control the application of voltage signals to the flip-flops for switching the flip-flops from one stable state to the other, according to a selected sequence in response to input pulses applied to the decade counter. The gates are suitably of the type described with reference to FIGURE 3a. The control voltage is supplied by the outputs produced by the flip-flops. If the output applied as a control voltage is a "1," the gate is closed. If the output is a "0," the gate will be open. The flip-flops within the decade unit are triggered from one stable state to the other stable state by the application to the conducting transistor of a negative going pulse which applies a negative bias to the transistor and renders it non-conductive. As the originally conducting transistor turns off, the other transistor will become conductively biased. Each input of each flip-flop within the decade unit is preceded by a gate such that a negative going pulse can be applied to the particular input only when the gate is open.

Initially, the dollars decade is preset to a zero count by applying a negative going reset pulse to the left inputs of the flip-flops. The Not Functions $\bar{A}$, $\bar{B}$, $\bar{C}$ and $\bar{D}$ will each be a digital "1," and the Functions will each be "0" as shown in Table I below:

TABLE I

| No. of Input Pulses | Not Function | | | | Function | | | |
|---|---|---|---|---|---|---|---|---|
| | $\bar{A}$ | $\bar{B}$ | $\bar{C}$ | $\bar{D}$ | D | C | B | A |
| 0 | 1 | 1 | 1 | 1 | 0 | 0 | 0 | 0 |
| 1 | 0 | 1 | 1 | 1 | 0 | 0 | 0 | 1 |
| 2 | 1 | 0 | 1 | 1 | 0 | 0 | 1 | 0 |
| 3 | 0 | 0 | 1 | 1 | 0 | 0 | 1 | 1 |
| 4 | 1 | 1 | 0 | 1 | 0 | 1 | 0 | 0 |
| 5 | 1 | 1 | 1 | 0 | 1 | 0 | 0 | 0 |
| 6 | 0 | 1 | 1 | 0 | 1 | 0 | 0 | 1 |
| 7 | 1 | 0 | 1 | 0 | 1 | 0 | 1 | 0 |
| 8 | 0 | 0 | 1 | 0 | 1 | 0 | 1 | 1 |
| 9 | 1 | 1 | 0 | 0 | 1 | 1 | 0 | 0 |
| 10 | 1 | 1 | 1 | 1 | 0 | 0 | 0 | 0 |

It will be seen that the control voltage applied to the gate 194 preceding the counter is a "0" initially and gate 194 will be open. Thus, the first input pulse will pass through gate 194 to the input of gate 198 preceding the right input to flip-flop 170 and to the input of gate 196 preceding the left input of flip-flop 170. As a binary "0" is applied to the control gate 198 and a binary "1" is applied to the control of gate 196, gate 198 is open and gate 196 is closed. The first pulse will, therefore, be applied to the right input, causing the flip-flop to switch to a state wherein the Function is a binary "1" and the Not Function is a binary "0." This is indicated in the Table I for the one input pulse. No other flip-flops are affected by the first input pulse. The second input pulse again passes through gate 194 and triggers the flip-flop 170 back to its other stable state, since gate 196 is now open and gate 198 is closed. In so doing, a negative going pulse is produced at its right output and applied to the input of gate 202. Gate 202 is open since a "0" is applied to its control, and this pulse will trigger flip-flop 172 to its other stable state, as indicated in Table I for two input pulses. The third input pulse is again passed by gate 194 and passes through gate 198 to again trigger flip-flop 180. The Function produced by flip-flop 170 changes from a "0" to a "1," providing a positive voltage which is blocked by gate 202 connected thereto. The fourth input pulse passes through gates 194 and 196 to again trigger flip-flop 170, producing a negative going pulse as the Function changes from a "1" to a "0." The negative going pulse is passed through gate 202 triggering flip-flop 172. The Function produced by flip-flop 172 changes from a "1" to a "0" pulse which passes through the gate 206 to trigger the flip-flop 174. The Not Function produced by flip-flop 174 becomes a "1," closing gate 194 which precedes the decade unit. The fifth input pulse to the decade unit cannot pass the gate 194 at this time, but is applied to the input of gate 204 preceding flip-flop 174. As a "0" is applied to its control, the gate 204 is open and flip-flop 174 is triggered to its opposite state. A negative going pulse is produced as the Function produced by flip-flop 174 changes from a "1" to a "0." Since the Function produced by flip-flop 176 is a "0," gate 210 is open. The negative going pulse passes through gate 210 to trigger flip-flop 176. The count thus proceeds according to Table I until on the ninth pulse, flip-flop 174 and flip-flop 176 are in their alternate states. The tenth input pulse then returns all of the flip-flops to their initial states and the Functions produced by flip-flops 170, 172, 174 and 176 are again "0."

The dollars/lb. control 128 comprises four ganged wafer switches such that movement of a single dial or switch will effect movement of the slide contact within each of the wafer switches. The slide contacts are each connected to ground through line 224. A selected number of switch contacts of each of the wafer switches is connected to each of tthe gates 120, 122, 124 and 126 to open and close that particular gate according to a selected sequence. The Not Functions $\bar{A}$, $\bar{B}$, $\bar{C}$ and $\bar{D}$ produced by the flip-flops within the decade counter are applied to the inputs of gates 120, 122, 124 and 126, respectively, with the outputs of the gates being connected to line 159. Switch contacts 1, 3, 5, 7 and 9 of switch 216 are commonly connected to gate 126 to open the gate when the slide contact 217 conductively engages one of these switch contacts. Similarly, switch contacts 8 and 9 of switch 218 are commonly connected to gate 124 to open the gate 124 when the slide contact 219 is positioned on either switch contact 8 or 9. Switch contacts 2, 3, 6, 7, 8 and 9 of switch 220 are commonly connected to gate 122 to open the gate when slide contact 221 is positioned thereon. And switch contacts 4, 5, 6, 7, 8 and 9 of switch 222 are commonly connected to gate 120 to open the gate when the slide contact 223 is positioned thereon. Thus, when a slide contact of a particular switch connects the gate through one of the commonly connected switch contacts to ground, the gate is open; otherwise, the gate is closed.

As noted earlier, the number of pulses to be passed to line 159 through the gates for every ten input pulses to the dollars decade 12 is equal to the number of dollars per pound of the article as set on the dollars/lb. control 128, wherein the particular switch contact coincides with the number of dollars per pound. Although the particular sequence in which the pulses are applied to line 159 is immaterial, some sequence must be used and that shown in the following Table II will be used for purposes of explanation and coincides with the particular electrical connections between the wafer switches and the gates just described.

TABLE II

| Switch Position | Pulse | | | | | | | | |
|---|---|---|---|---|---|---|---|---|---|
| | 1 | 2 | 3 | 4 | 5 | 6 | 7 | 8 | 9 |
| 0 | | | | | | | | | |
| 1 | | | | | X | | | | |
| 2 | | X | | | | | X | | |
| 3 | | X | | | X | | X | | |
| 4 | X | | X | | | | X | | |
| 5 | X | | X | | X | | X | | |
| 6 | X | X | X | | | X | X | X | |
| 7 | X | X | X | | X | X | X | X | |
| 8 | X | X | X | X | | X | X | X | X |
| 9 | X | X | X | X | X | X | X | X | X |

Since the Not Functions $\bar{A}$, $\bar{B}$, $\bar{C}$ and $\bar{D}$ are applied to the inputs of the gates 120, 122, 124 and 126, it can be seen that a negative pulse would be applied to these gates only when the Not Function changes from a "1" to a "0." The particular Not Function produced at any time is shown in Table I. With the control 128 in the 1 position, only gate 126 will be open. From Table I, it can be seen that the Not Function produced by the flip-flop 176 changes from a "1" to a "0" on the fifth input pulse to the decade unit, at which time a negative going pulse is passed through the gate 126 to the line 159 as shown in Table II. With the control 128 in the 2 position, only gate 122 will be open, and from Table I, it can be seen that the Not Function $\bar{B}$ changes from a "1" to a "0" on the second and the seventh input pulse to the decade unit, as shown in Table II. By positioning the control 128 in its various positions, it can be seen that pulses will be applied to the line 159 from the decade unit according to the number and sequence shown in Table II. In all cases, the number of pulses applied to the line 159 is equal to the switch position for each group of ten input pulses. It is again pointed out that the sequence in which gates open for passing pulses to the line 159 is immaterial and may be varied by changing the connections on the switches.

Figure 5:
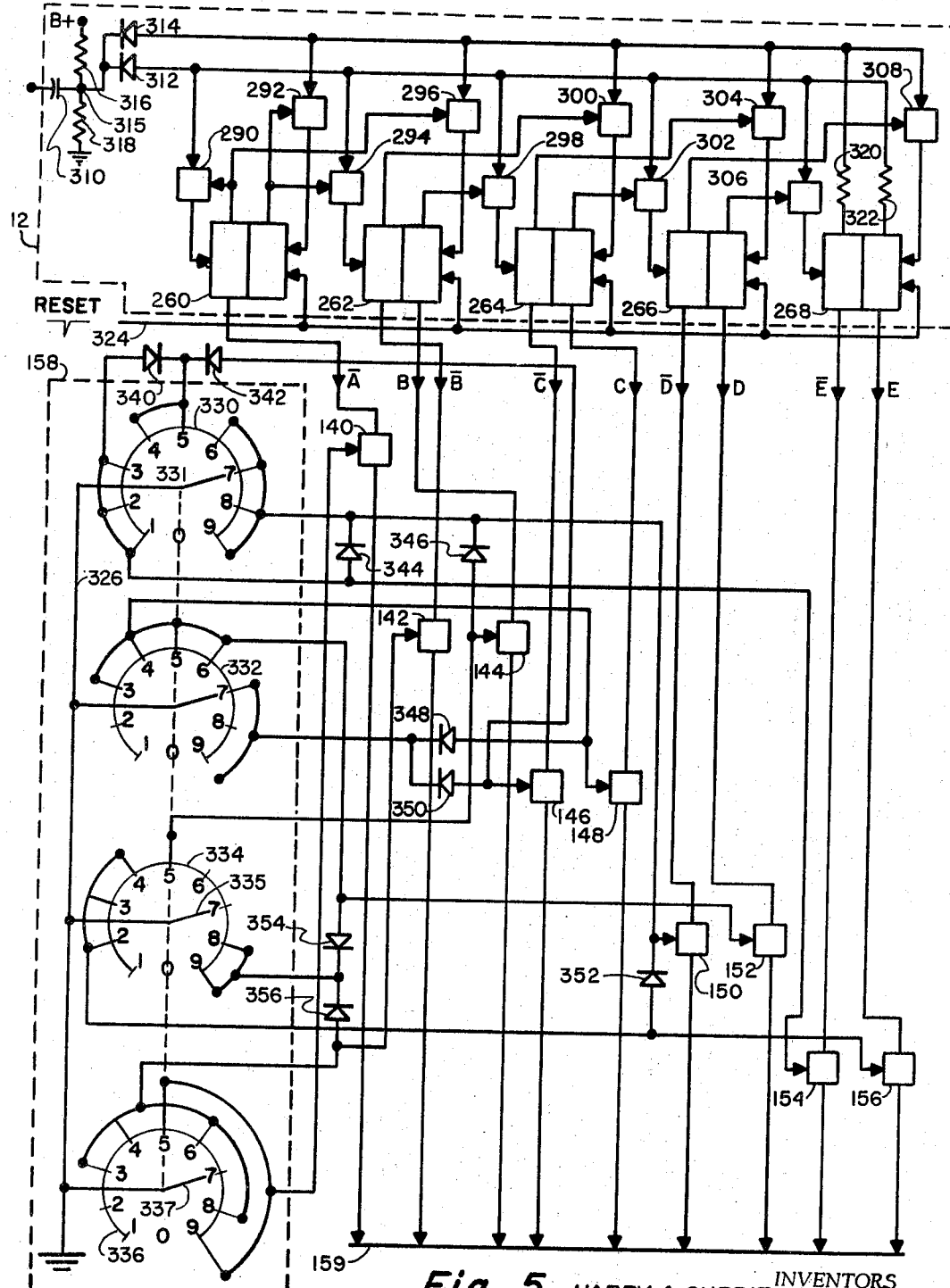
FIGURE 5 is a block diagram illustrating another stage of the decimal rate multiplication system.

The cents decade 12, the cents/lb. control 158 and the gates for passing the pulses to line 159 are shown in FIGURE 5. The cents decade 12 is similar to the dollars and dimes decades in that it performs a count of ten functions, but is different therefrom in that it includes five flip-flops instead of four. By using five flip-flops connected to form the decade unit, a total of ten Functions and Not Functions can be obtained, making it easier to derive the proper sequence of pulses from the flip-flops which are to be applied to line 159 through gates 140, 142, 144, 146, 148, 150, 152, 154 and 156. The cents decade also includes gates identical to that described with reference to FIGURE 3a preceding the inputs to each flip-flop, although the sequence in which the gates are opened and closed is different from that described with reference to the dollars and dimes decades. The cents/lb. control 158 is more complex than that previously described to take into account the opening and closing of a greater number of gates.

The cents decade comprises five flip-flops 260, 262, 264, 266 and 268 of the conventional type previously described. Pulses are applied to the input of the cents decade through a capacitor 310 connected to a pair of parallel connected diodes 312 and 314. As described previously, one pulse is applied to the cents decade by amplifier 4 for each hundred pulses applied to the dollars decade. The anode of diode 312 is connected to the right hand side of flip-flop 268 through resistor 322, and the anode of diode 314 is connected to the left hand side of flip-flop 268 through resistor 320. A resistor 316 is connected between a source of positive D.C. potential and the juncture 315, capacitor 310 and the two diodes, as shown. Another resistor 318 is connected between juncture 315 and ground. Resistor 318 is selected to be about twice the resistance of resistor 316. The positive D.C. potential applied to resistor 316 is suitably in the order of 18 volts such that the potential at juncture 315 is a positive 12 volts.

When the Not Function of flip-flop 268 is a "1," indicated by a positive potential of about 18 volts, a positive voltage is applied to the anode of diode 314 through resistor 320 and upon the application to the input of a negative pulse of about 12 volts, the voltage at the interconnection of the capacitor and diode 314 is reduced to zero, thus forward biasing diode 314. It can then be seen that pulses to the input of the cents/lb. decade will be passed through diode 314 when the Not Function produced by flip-flop 268 is a "0." Conversely, when the Function produced by flip-flop 268 is a "1," a positive voltage is applied to the anode of diode 312 through resistor 322, and upon the application to the input of a negative pulse of about 12 volts, the voltage at the interconnection of the capacitor and diode 312 is reduced to zero, thus forward biasing diode 312. The Not Function of flip-flop 268 is a zero and the diode 314 is reverse biased about 12 volts, thus preventing a negative going pulse of approximately 12 volts at the input from forward biasing diode 314. It can be seen that pulses to the input of the cents/lb. decade will be passed through diode 312 when the Function produced by flip-flop 268 is a "1."

Initially, the cents decade is preset to a zero by applying a negative pulse along line 324 to the right hand inputs of the various flip-flops, which triggers all the flip-flops to a first state wherein the Functions provided are each a "1," and the Not Functions are each a "0," as shown in Table III below:

Thus, diode 314 is reversed biased, and any input pulses will be passed through diode 312. As shown in the figure, there are five gates 290, 294, 298, 302 and 306, each of which has its input connected to the anode of the diode 312. The output of each of the gates is connected to the left input of the flip-flops, and the control voltage applied is the Function produced by the preceding flip-flop except that gate 290 is controlled by the Not Function of flip-flop 260. Similarly, gates 292, 296, 300, 304 and 308 are connected between the anode of diode 314 and the right inputs of the flip-flops. The gates connected to the anode of diode 314 are controlled by the potentials representing the Not Functions of the preceding flip-flops, except gate 292, which is controlled by the Function of flip-flop 260. From Table III it can be seen that gates 290 and 296 are initially open and that the first input pulse will be passed through diode 312 and through only gate 290 to trigger flip-flop 260 to its alternate state as shown in Table III. Gates 290 and 296 then close, as the Not Function of flip-flop 260 becomes a "1," and gates 292 and 294 are opened. The second input pulse passes through diode 312 and through gate 394 to trigger flip-flop 262 to its alternate state which opens gate 298. It can be seen that the flip-flops are sequentially triggered to their alternate states in response to the first five input pulses. On the fifth input pulse, flip-flop 268 is triggered to its alternate state thus reversed biasing diode 312 so that it will no longer pass input pulses and forward biasing diode 314 to pass input pulses. The next five input pulses are passed through gates 292, 296, 300, 304 and 308 in sequential order to trigger the flip-flops to their initial states in sequential order, thus following the scheme shown in Table III.

In order to accumulate the proper total price as was noted earlier, the sequence in which pulses are to be applied to line 159 from the cents decade 12 is such that one pulse will be applied to line 159 when the number of cents per pound times the number of input pulses to decade 12 is equal to or greater than ten but less than twenty, a second pulse will be applied when this product is equal to or greater than twenty but less than thirty, and so forth, as shown in the following Table IV.

TABLE IV

| Switch Position | Pulse | | | | | | | | | |
|---|---|---|---|---|---|---|---|---|---|---|
| | 1 | 2 | 3 | 4 | 5 | 6 | 7 | 8 | 9 | 10 |
| 0 | | | | | | | | | | X |
| 1 | | | | | X | | | | | X |
| 2 | | | | X | | | X | | | X |
| 3 | | | X | | X | | | X | | X |
| 4 | | X | | X | | X | | X | | X |
| 5 | | X | X | X | | X | X | X | | X |
| 6 | | X | | X | X | X | | X | X | X |
| 7 | | X | X | X | X | | X | X | X | X |
| 8 | | X | X | X | X | X | X | X | X | X |
| 9 | X | X | X | X | X | X | X | X | X | X |

To produce this sequence of pulses, a separate gate is connected between the line 159 and each of the outputs of each of the flip-flops except the right hand output of flip-flop 260. The various gates are controlled in response to switch positions on the cents/lb. control 158 and are

TABLE III.—COUNTER LOGIC

| No. of Input Pulses | Not Function | | | | | Function | | | | |
|---|---|---|---|---|---|---|---|---|---|---|
| | $\overline{E}$ | $\overline{D}$ | $\overline{C}$ | $\overline{B}$ | $\overline{A}$ | A | B | C | D | E |
| 0 | 0 | 0 | 0 | 0 | 0 | 1 | 1 | 1 | 1 | 1 |
| 1 | 0 | 0 | 0 | 0 | 1 | 0 | 1 | 1 | 1 | 1 |
| 2 | 0 | 0 | 0 | 1 | 1 | 0 | 0 | 1 | 1 | 1 |
| 3 | 0 | 0 | 1 | 1 | 1 | 0 | 0 | 0 | 1 | 1 |
| 4 | 0 | 1 | 1 | 1 | 1 | 0 | 0 | 0 | 0 | 1 |
| 5 | 1 | 1 | 1 | 1 | 1 | 0 | 0 | 0 | 0 | 0 |
| 6 | 1 | 1 | 1 | 1 | 0 | 1 | 0 | 0 | 0 | 0 |
| 7 | 1 | 1 | 1 | 0 | 0 | 1 | 1 | 0 | 0 | 0 |
| 8 | 1 | 1 | 0 | 0 | 0 | 1 | 1 | 1 | 0 | 0 |
| 9 | 1 | 0 | 0 | 0 | 0 | 1 | 1 | 1 | 1 | 0 |
| 10 | 0 | 0 | 0 | 0 | 0 | 1 | 1 | 1 | 1 | 1 | opened in response to the switch being grounded and closed in response to the switch connection being opened as described in conjunction with FIGURE 3b. Thus the Not Function produced by flip-flop 260 is applied to line 159 through gate 140. In similar fashion, the remaining Functions and Not Functions, except the Function produced by flip-flop 260, are applied to line 159 through gates 142, 144, 146, 148, 150, 152, 154 and 156. The cents/lb. control 158 comprises four wafer switches 330, 332, 334 and 336 ganged on a single shaft. A pulse is applied to the input of one of the gates when any one of the flip-flops changes from one stable state to the other. From Table III, it can be seen that only one of the flip-flops will change its state in response to one input pulse to the cents decade 12.

When the cents/lb. control is set at 1, as shown in Table IV, a pulse should be applied to line 159 only in response to the tenth input pulse to the cents decade 12. Referring to Table III, it can be seen that the only flip-flop being triggered on the tenth input pulse is flip-flop 268, and that the Not Function of flip-flop 268 changes from a "1" to a "0." Thus the negative going pulse produced as the Not Function of binary bit E changes from a "1" to a "0" will be applied to the input of gate 154. The control of gate 154 is connected to switch contact 1 of wafer switch 330 such that when the slide contact 331 of the wafer switch is in contact therewith, it is grounded through line 326 and opens gate 154. When the cents/lb. control is set at 2, it can be seen that a pulse should be passed to line 159 in response to the fifth and the tenth input pulses. The control of gate 154 is also connected to switch contact 2 of wafer switch 330 and the gate will pass a pulse to line 159 in response to the tenth input pulse to the decade unit. Also, the control of gate 156 is connected to contact 2 of switch 335 and gate 156 will also be open. From Table III, it can be seen that the only flip-flop undergoing a transition in response to the fifth input pulse is flip-flop 268, and that since the Function E thereof is going from a "1" to a "0," a pulse will be passed through gate 156 in response to the fifth input pulse.

When the cents/lb. control is set at 3, pulses from the cents decade are applied to line 159 on the 4th, 7th and 10th pulses as shown in Table IV, and from Table III, it can be seen that these pulses will be applied as the functions D, $\bar{B}$ and $\bar{E}$ each change from a digital "1" to a digital "0." To effect this, $\bar{B}$ is applied to gate 142, D is applied to gate 152 and $\bar{E}$ is applied to gate 154. The control of gate 142 is connected to switch contact 3 of wafer switch 336, the control of gate 152 is connected to switch contact 3 of wafer switch 332, and the control of gate 154 is connected to switch contact 3 of wafer switch 330. No other gates are open when the control is set at 3. When the cents per pound control is set at 4, Table IV shows that pulses should be applied to line 159 in response to the 3rd, 5th, 8th and 10th input pulses to the cents decade 12. Again from Table III, it can be seen that functions C, E, $\bar{C}$ and $\bar{E}$ will change from a "1" to a "0," producing negative going pulses which are to be applied to line 159. To effect this, the control of gate 148 is connected to switch contact 4 of wafer switch 332, the control of gate 156 is connected to switch contact 4 of wafer switch 334, the control of gate 146 is connected to switch contact 4 of wafer switch 330 through diode 342, and the control of gate 154 is connected to switch contact 4 of wafer switch 330 through diode 340. The functions C, E, $\bar{C}$ and $\bar{E}$ are each applied to the inputs of gates 148, 156, 146 and 154, respectively.

Diode 342 connected between switch contacts 4 and 5 of wafer switch 330 and gate 146 is provided to isolate gate 154 when sliding contact 333 of wafer switch 332 is positioned on switch contact 7, 8 or 9, as will be seen hereinafter. Diode 340 is provided to isolate gate 146 and prevent it opening when slide contact 331 of wafer switch 330 is on switch contacts 1, 2 and 3. As can be seen, when the cents per pound control is set on 4, the cathodes of the two diodes 340 and 342 are grounded and are forward biased to permit conduction therethrough, thus opening gates 146 and 154.

When the cents per pound control is set at 5, it can be seen from Table IV that pulses should be applied to line 159 in response to the 2nd, 4th, 6th, 8th and 10th input pulses to the cents decade 12; and from Table III, it can be seen that these pulses are produced as functions B, D, $\bar{A}$, $\bar{C}$ and $\bar{E}$ change from a "1" to a "0." To effect this, functions B, D, $\bar{A}$, $\bar{C}$ and $\bar{E}$ are applied to the inputs of gates 144, 152, 140, 146 and 154, respectively. The control of gate 144 is connected to switch contact 5 of wafer switch 334, the control of gate 152 is connected to switch contact 5 of wafer switch 332, the control of gate 140 is connected to switch contact 5 of wafer switch 336, the control of gate 146 is connected to switch contact 5 of wafer switch 330 through diode 342, and the control of gate 154 is connected to switch contact 5 of wafer switch 330 through diode 340. The diodes 340 and 342 are provided for isolating the various gates, as previously described.

Extending this procedure, for every setting of the cents per pound control through 9, it can be seen that pulses are to be applied to the line 159 as set forth in Table IV, and by referring to Table III wherein only one of the Functions changes from a "1" to a "0" in response to a single input pulse thereto, the particular gates to be opened can be seen by comparing Table III with Table IV. Moreover, the other various diodes 334, 346, 358, 350, 352, 354 and 356 are provided to isolate the various gates from each other so as to prevent erroneous openings of gates.

The above described decimal rate multiplication system is important in that it provides several advantages. It will be appreciated by utilizing a hundredth cents decade and connecting the cents decade like the dollars decade, the desired multiplication rounding off could be accomplished. This would be of some disadvantage in that it would require one additional binary decimal code decade. However, of much importance, it would be necessary to increase the clock frequency an order of magnitude to obtain the same computation rate as that provided by the present invention.

Thus, in one specific example of the present invention, the clock frequency is 200 kilocycles per second, providing computation of price information at a much faster rate than available competitive systems. At such a comparatively low clock pulse rate, very reliable low speed logic systems, which are relatively simple and inexpensive, can be used. If the rounding off were obtained by the expedient of adding the additional hundredth cents decade, it would be necessary to increase the clock frequency to 2 megacycles per second to obtain the same computation rate. A 2 megacycle clock rate would demand much more expensive components, much more complicated circuitry and result in a generally lower level of reliability as compared to the present system.

It can, therefore, be seen from the above description that the present invention provides an improved decimal rate system that possesses many advantages over prior art systems. The essential element of the system is a counter having a plurality of outputs for generating at least one pulse at one of the plurality of outputs in response to each of the series of pulses applied to the input thereof and control means coupled to the plurality of outputs for applying to a common terminal a selected sequence of pulses derived from pulses occurring at the plurality of ouptuts. The selected sequence consists of one output pulse occurring at the common terminal each time the product of the number of pulses applied to the input of the counter times the multiplier set in the control means increases by ten.

This system as a whole can be seen to comprise a first multiplier register, designated the price/lb. register in the specific example, having a number of decade counters equal to the number of digits in the multiplier. A second register, herein designated the gross weight register, is provided for counting the number of pulses equal to the multiplicand which is to be multiplied and a total register, herein designated the total price register, is provided for counting the number of pulses representative of the product of the multiplier and the multiplicand. A control means is associated with each of the counters in the first register, each control means being settable to a particular digit in the multiplier. The control means selectively passes pulses to a bus or common terminal. The pulses are then applied through a decade counter which is preset to 5 to the register which indicates the product.

Although the invention has been described with reference to only a single preferred embodiment, many changes and modifications which will become obvious to those skilled in the art in view of the foregoing description may be made therein without departing from the scope of the invention which is defined in the appended claims.

What we claim is:

1. A system for multiplying a first number by a second number to produce a third number equal to the integral portion of the product of said first and said second numbers, said first number being represented by a first series of pulses and said third number being represented by a selected sequence of pulses, comprising:
   (a) a decade counter means having a plurality of outputs for generating one output signal at one of said plurality of outputs in response to each of said first series of pulses applied to the input thereof; and
   (b) control means coupled to said plurality of outputs for applying to a common terminal said selected sequence of pulses derived from output signals occurring at said plurality of outputs, said selected sequence consisting of one of said pulses being applied to said common terminal each time the product of the number of pulses in said first series applied to the input of said decade counter means and said second number increases by ten.

2. A system according to claim 1 wherein said decade counter means comprises a plurality of bistable elements, each having a pair of outputs.

3. A system according to claim 1 wherein said decade counter means comprises five bistable elements, each having a pair of outputs, and said decade counter means generates one output signal at one of said pair of outputs of one of said bistable elements in response to each of said first series of pulses applied to the input thereof.

4. A system according to claim 1 wherein said control means comprises a plurality of separate gate means connected between said plurality of outputs and said common terminal for applying pulses to said common terminal when the gate means connected to the output at which an output signal occurs is open, and means for opening selected ones of said gates to apply said selected sequence of pulses to said common terminal.

5. A system according to claim 1 wherein said decade counter means generates one output signal at each of said plurality of outputs for each ten consecutive pulses in said first series applied to the input thereof.

6. A system according to claim 1 wherein said decade counter means comprises five bistable elements, each having a pair of outputs; and said control means comprises eight gate means connected between each of said pair of outputs of four of said bistable elements, respectively, and said common terminal and a ninth gate means connected between one of said pair of outputs of the other of said bistable elements and said common terminal for applying pulses to said common terminal when said gate means are open responsive to said output signals and means for opening selected ones of said nine gate means to apply said selected sequence of pulses to said common terminal.

7. A system for multiplying a first number by a second number to produce a third number equal to the product of said first and said second numbers excluding the least significant digits of said product, said first and said third numbers being represented by first and second series of pulses, respectively, comprising:
   (a) first decade counter means representative of said first number having an input and a first plurality of outputs;
   (b) means for applying said first series of pulses to said input of said first decade counter;
   (c) said first decade counter means generating one output signal at one of said first plurality of outputs in response to each pulse at its input of said first series of pulses representative of said first number;
   (d) a second decade counter means having an input and a second plurality of outputs, said first decade counter means coupled to the input of said second decade counter means to generate a pulse at the input of said second decade counter means in response to each tenth consecutive pulse applied to the input of said first decade counter means;
   (e) said second decade counter means generating one output signal at one of said second plurality of outputs in response to each input pulse to said second decade counter means;
   (f) first control means coupled to said first plurality of outputs for applying to a common terminal a first selected sequence of pulses representative of a portion of said second series of pulses in response to pulses applied to the input of said first decade counter means, the number of pulses in said first selected sequence for each ten consecutive pulses applied to the input of said first decade counter means being equal to the next to the least significant digit of said second number;
   (g) second control means coupled to said second plurality of outputs for applying to said common terminal a second selected sequence of pulses representative of another portion of said second series of pulses in response to pulses applied to the input of said second decade counter means, said second selected sequence consisting of one of said pulses occurring each time the product of the number of pulses applied to the input of said second decade counter means and the least significant digit of said second number increases by ten;
   (h) the selected sequence of pulses applied to said common terminal comprising said second series of pulses.

8. A system according to claim 7 wherein each of said first and said second decade counter means comprises a plurality of bistable elements each having a pair of outputs.

9. A system according to claim 7 wherein said second decade counter means comprises five bistable elements, each having a pair of outputs, and said second decade counter means generates one output signal at one of said pair of outputs from one of said bistable elements in response to each pulse applied to the input thereof.

10. A system according to claim 7 wherein said first and said second control means comprises a first and second plurality of separate gate means connected between said common terminal and said first and said second plurality of outputs, respectively, for passing pulses occurring at said first and said second plurality of outputs, respectively, to said common terminal when the gate means connected to the output at which a pulse occurs is open, and first and second switch means coupled to said first and said second plurality of separate gate means, respectively, for opening selected gates to pass said first and said second selected sequence of pulses, respectively, to said common terminal.

11. A decimal rate multiplication system for obtaining the product of a multiplier and a multiplicand comprising:
  (a) a first register having a number of decades equal to one less than the number of digits in the multiplier and representing all but the least significant digit of said multiplier, each decade being composed of four bistable multivibrator circuits and having a plurality of outputs;
  (b) a second register having one decade representing the least significant digit of said multiplier, said decade being composed of five bistable multivibrator circuits and having a plurality of outputs;
  (c) means for applying to said first register a number of electrical pulses which is a function of said multiplicand;
  (d) means for applying to said second register a number of electrical pulses equal to the number applied to the input of said first register divided by $10^n$, where $n$ is the number of decades in said first register;
  (e) first control means for each decade of said register, each of said control means being coupled to said plurality of outputs of said first register and settable in accordance with the digit of said multiplier;
  (f) each of said first control means being effective to apply to a common terminal a number of pulses equal to the digit set therein for each 10 pulses applied to the input of the decade connected thereto;
  (g) second control means coupled to said second plurality of outputs of said second register and settable in accordance with the least significant digit of the multiplier; and
  (h) said second control means being effective to apply to said common terminal a pulse each time the product of the least significant digit and the number of electrical pulses applied to the input of the decade connected thereto increases by 10.

12. A decimal rate multiplication system for multiplying a multiplicand by a multiplier to obtain a product, comprising:
  (a) a first register having a number of serially connected decade counters equal to the number of digits in said multiplier;
  (b) means for applying to said first register a number of pulses representative of said multiplicand;
  (c) a second register having a number of serially connected decade counters equal to the number of digits in said product;
  (d) each of said decade counters having a plurality of outputs, the potential of at least one of said outputs of a decade changing in response to each pulse applied to its input;
  (e) a separate control means associated with each of the decade counters in said first register and coupled to said plurality of outputs for applying to a common terminal a selected sequence of pulses responsive to said plurality of outputs changing from a first voltage level to a second voltage level;
  (f) each of said control means being settable to one digit of the multiplier;
  (g) the number of pulses applied to said common terminal for each ten pulses applied to each of the decades except the decade associated with the least significant digit being equal to the one digit of the multiplier;
  (h) said control and decade for the least significant digit only being effective to apply a pulse to said common terminal each time the product of the number of pulses applied to the least significant decade and the least significant digit of said multipler increases by 10;
  (i) a separate decade counter preset to a count of five;
  (j) means connecting said common terminal to the input of said separate decade counter; and
  (k) means connecting the output of said separate decade counter to the input of said second register.

13. A decimal rate multiplication system according to claim 12 further including a third register and means connecting said third register to receive an input pulse each time a pulse is applied to said least significant decade.

14. A decimal rate multiplication system according to claim 13 further including means to prevent the application of additional pulses to the input of said register responsive to the count in said third register attaining a level indicative of a desired multiplicand.

15. A decimal rate multiplication system comprising:
  (a) a decade counter having an input and ten outputs;
  (b) control means connected to nine of said outputs and settable to a desired multiplier digit;
  (c) the voltage level at each one of said nine outputs changing at least once in response to each series of ten pulses applied to said decade counter, at least one of said outputs changing voltage level responsive to each input pulse;
  (d) said control means being effective to apply electrical pulses to a common electrode responsive to changes in voltage levels at said nine outputs in accordance with the following table:

| Multiplier Digit Setting | Input Pulse in Series of Ten | | | | | | | | | |
|---|---|---|---|---|---|---|---|---|---|---|
| | 1 | 2 | 3 | 4 | 5 | 6 | 7 | 8 | 9 | 10 |
| 0 | | | | | | | | | | |
| 1 | | | | | | | | | | X |
| 2 | | | | | X | | | | | X |
| 3 | | | | X | | | X | | | X |
| 4 | | | X | | X | | | X | | X |
| 5 | | X | | X | | X | | X | | X |
| 6 | | X | | X | X | | X | | X | X |
| 7 | | X | X | | X | X | | X | X | X |
| 8 | | X | X | X | X | | X | X | X | X |
| 9 | | X | X | X | X | X | X | X | X | X |

16. A decimal rate multiplication system for multiplying a multiplicand by a multiplier to obtain a product that comprises:
  (a) a first register having an input and a plurality of outputs;
  (b) a second register for storing a count representative of the product;
  (c) means settable to said multiplier connected to said plurality of outputs for applying to said second register a number of pulses representative of said product responsive to said first register receiving at its input a number of pulses representative of said multiplicand;
  (d) a third register for storing a count representative of the multiplicand;
  (e) generating means for generating electrical pulses;
  (f) gating means connected to said generating means effective when in a first condition to apply a series of said electrical pulses to said first register and to apply to said third register a number of electrical pulses which is a factor of the number of electrical pulses in said series;
  (g) means settable to a predetermined multiplicand;
  (h) comparision means connected to said means settable to a predetermined multiplicand and said third register and effective to provide an output signal of predetermined character responsive to comparison between said predetermined multiplicand and the multiplicand represented by the count stored in said third register;
(i) means for placing said gating means in said first condition at the beginning of a multiplication cycle; and
(j) means effective responsive to said output signal of predetermined character for placing said gating means in a second condition.

References Cited by the Examiner
UNITED STATES PATENTS

| | | | |
|---|---|---|---|
| 2,916,211 | 12/1959 | Schulze | 235—160 |
| 2,954,167 | 9/1960 | Williams | 235—160 |
| 3,081,031 | 3/1963 | Livesay | 235—160 |
| 3,169,185 | 2/1965 | Nines | 235—160 |

MALCOLM A. MORRISON, *Primary Examiner.*

I. FAIBISCH, M. J. SPIVAK, *Assistant Examiners.*